United States Patent [19]

Thacker et al.

[11] 3,882,583

[45] May 13, 1975

[54] METHOD AND APPARATUS FOR ORIENTING RANDOMLY PLACED ROLLING ELEMENTS

[75] Inventors: Vic N. Thacker; Loren H. Rasmussen, both of Kokomo, Ind.

[73] Assignee: Medco Inc., Kokomo, Ind.

[22] Filed: May 22, 1974

[21] Appl. No.: 472,171

[52] U.S. Cl. .......................................... 29/148.4 A
[51] Int. Cl. ...................... B23p 11/00; B23p 19/04
[58] Field of Search.... 29/148.4 A, 148.4 C, 201 R, 29/201 D

[56] References Cited
UNITED STATES PATENTS

| 3,103,059 | 9/1963 | Rozentals | 29/148.4 A |
| 3,533,151 | 10/1970 | Gaudry | 29/201 R |

Primary Examiner—Thomas H. Eager
Attorney, Agent, or Firm—Woodard, Weikart, Emhardt & Naughton

[57] ABSTRACT

Randomly placed rolling elements such as balls for anti-friction type bearings may be precisely oriented in individual races or double races by the application of a rotational or oscillatory force. By the application of such force, the rolling elements may be prcisely positioned at spaced intervals throughout the races. An orienting cylinder having at least one notched end wherein each of the notches is of a size and configuration to receive a rolling element is used to orient said rolling elements during the application of said force. One-half of a rolling element retaining cage may be mounted on said notched end of said orienting cylinder to provide convenience in installing the retaining cage after the rolling elements are properly spaced.

12 Claims, 7 Drawing Figures

PATENTED MAY 13 1975 3,882,583

METHOD AND APPARATUS FOR ORIENTING RANDOMLY PLACED ROLLING ELEMENTS

BACKGROUND OF THE INVENTION

1. Field of the Invention

This invention relates to a process of mechanical manufacture having cages, retainers or separators, and to apparatus for orienting rolling elements in anti-friction bearings.

2. Description of the Prior Art

Anti-friction bearings are adaptable for use in many different capacities, for example, in idlers, pillow blocks and bearing wheels. Other uses for anti-friction type bearings are of course common.

This invention is directed to the need for a simple, dependable and flexible apparatus for orienting rolling elements in such anti-friction bearings. Apparatus in current general use is needlessly cumbersome to manufacture and operate and does not lend itself to easy automation. It is subject to human error as to accuracy of placement. It is not sufficiently flexible to the needs of a wide variety of manufacturing processes currently used.

Another existing method of positioning the balls within the races of the anti-friction bearings is wherein the balls are oriented by the use of tapered pins. These and other methods are intricate and do not lend themselves readily to automation. Sample patents teaching other methods are U.S. Pat. No. 3,103,059 (1963) to Rozentals and U.S. Pat. No. 3,533,151 (1970) to Gaudry.

SUMMARY OF THE INVENTION

This invention relates to an apparatus for orienting randomly placed rolling elements comprising a cylindrical member, wherein said cylindrical member has at least one end spacedly notched such that the notches can receive a rolling element. This invention further relates to a process for orienting randomly placed rolling elements comprising placing an anti-friction bearing sub-assembly with randomly spaced rolling elements in contact with a cylindrical member, said cylindrical member having at least one end spacedly notched so said notches can receive said rolling elements and causing one of said races to move while the other is held stationary, said movement continuing until each of the randomly spaced rolling elements has been received by one of said notches.

It is therefore an object of this invention to provide a method for orienting randomly placed rolling elements without requiring elaborate or intricate equipment.

It is a further object of this invention to provide a method for orienting randomly placed rolling elements which lends itself readily to automation.

It is a still further object of this invention to provide a method for orienting randomly placed rolling elements wherein a retaining cage can be applied to said rolling elements during said method.

It is an additional object of this invention to provide an apparatus for orienting randomly placed rolling elements which is simple in both construction and use.

It is a further object of this invention to provide an apparatus for orienting randomly placed rolling elements wherein the orienting apparatus may be made to receive any size or shaped rolling elements without unnecessarily or unduly complicating the orienting structure.

These and other objects of this invention will become apparent from the following description of the preferred embodiment.

DESCRIPTION OF THE PREFERRED EMBODIMENT

Figure 1:
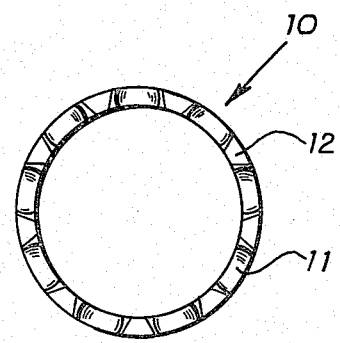
FIG. 1 is a top view of the "orienter" cylinder.
Figure 2:
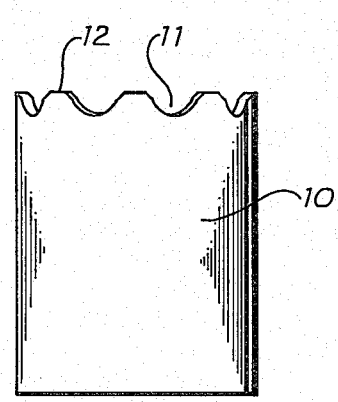
FIG. 2 is a side view of the "orienter" cylinder.
Figure 3:
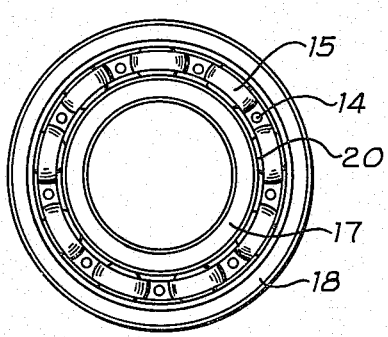
FIG. 3 is a top view of the anti-friction bearing with retaining cage.
Figure 4:
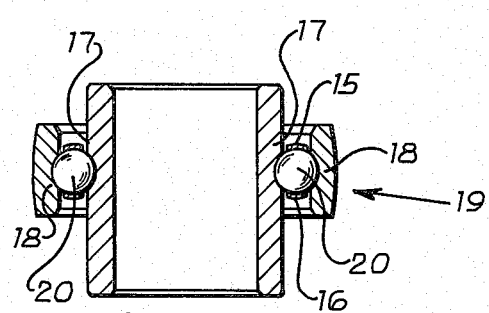
FIG. 4 is a cross-sectional view of the anti-friction bearing with retaining cage.

For the purposes of promoting an understanding of the principles of the invention, reference will now be made to the embodiment illustrated in the drawings and specific language will now be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

An orientor cylinder, designated by the number 10 in the drawings, comprises the central structural element of this invention. The orientor cylinder 10 may be made from any structurally suitable material. The cylinder must have enough strength to withstand pressures and wear and therefore the preferred material is hardened tool steel. The orientor cylinder 10 is notched on at least one end. The notches are of a size and configuration so as to readily receive the rolling elements of an anti-friction type bearing sub-assembly. For purposes of the drawings, the notches will be referred to by the number 11, whereas the unnotched portion of the end of cylinder 10 will be designated by the number 12. As stated previously, each notch defines a pocket for receiving a rolling element. The size and strength of the individual orienting cylinder 10 and the number and size of the notches 11 may be varied to suit individual needs and specific bearing sub-assemblies.

Figure 5:
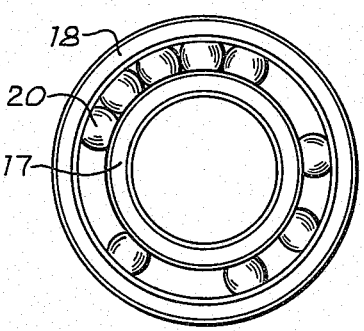
FIG. 5 is a top view of the anti-friction bearing with randomly placed rolling elements.
Figure 6:
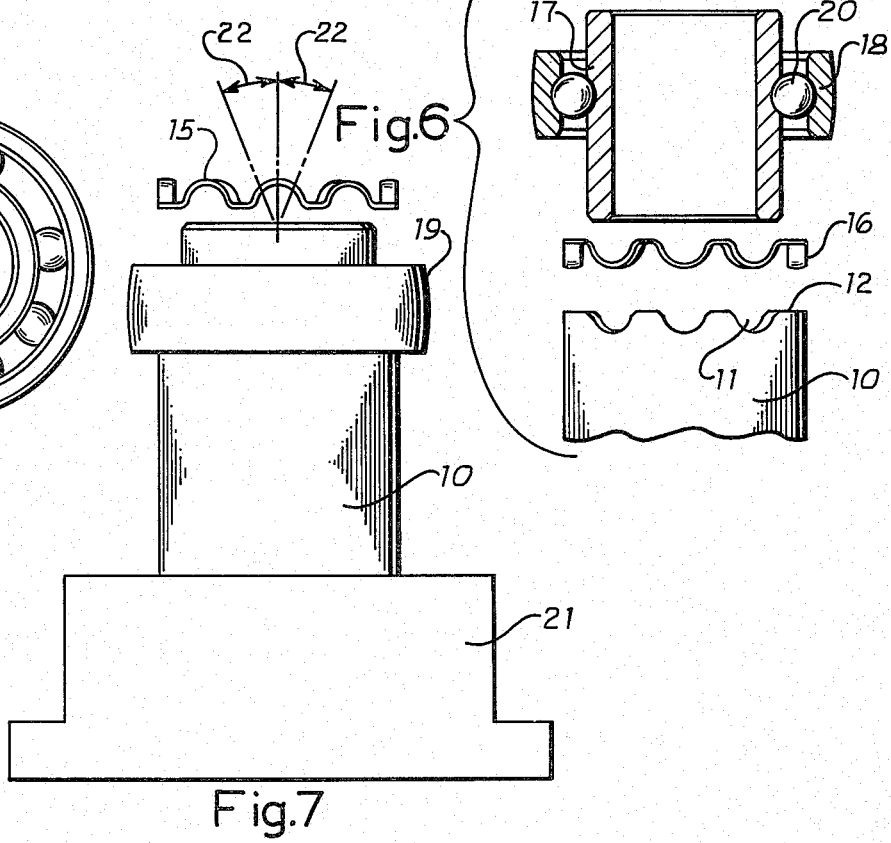
FIG. 6 is a disassociated cut away, side view of the entire cylinder-bearing assembly.
Figure 7:
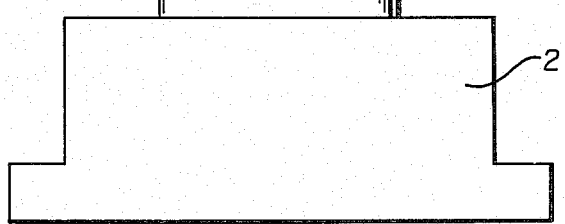
FIG. 7 is a side view of one embodiment of the entire assembly.

The cylinder 10 is designed to receive a bearing sub-assembly 19 having randomly placed rolling elements 20. The rolling elements 20 in bearing 19 are held in place by inner race 17 and an outer race 18. By relative motion of one race of the bearing sub-assembly 19 and the orienting cylinder 10, the rolling elements 20 will be oriented from their random position (as shown in FIG. 5) in a preassembled bearing to an exact position in the ball orienting device. After the rolling elements 20 are in their proper position, a retaining cage can be inserted and the bearing is ready to have the two halves, 15 and 16, of the retaining cage fastened together. The retaining cage halves 15 and 16, are fastened together by riveting, welding or other suitable technique.

The relative motion of one race of the bearing sub-assembly 19 and orienting cylinder 10 can be in a clockwise or counterclockwise rotary direction or the motion can be oscillatory. The bearing 19 is allowed to tilt slightly as indicated by angles 22 with respect to the axis of the cylinder 10. This allows the rolling elements 20 to climb over the unnotched portions 12 of the orienting cylinder 10. During rotation one race, 17 and 18, is held stationary with respect to the cylinder 10; and the other race is allowed to turn freely. The rolling elements will usually find their proper location in one or two revolutions. A maximum number of revolutions can be predetermined depending on the size and weight of the rolling elements 20 and the size and weight of the bearing assembly 19.

An alternative preferred embodiment of this invention involves the use of the ball retaining cage 16 to orient the rolling elements. One-half of the cage, the bottom half 16, is used as the notched end of the orienting cylinder 10 and the process is run as described above. The rolling element retainer cage halves 15 and 16 can be designed to be compatible with this process. The rolling element retainer cage bottom half 16 may either be fixedly attached to the orienting cylinder 10 or may be fit into receiving notches on said cylinder.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Apparatus for orienting randomly placed rolling elements comprising:
    a cylindrical member, said cylindrical member having at least one end spacedly notched such that said notches can receive a rolling element.

2. Apparatus for orienting randomly placed rolling elements comprising:
    a cylindrical member, said cylindrical member having at least one end spacedly notched such that said spacedly notched end can receive a first half of a rolling element retaining cage, said first half of a rolling element retaining cage being mounted on said spacedly notched circumference.

3. The apparatus of claim 2 wherein the unnotched portions of said spacedly notched end comprise anvil heads for rivets, said rivets being used to join the first and second halves of said rolling element retaining cage.

4. The apparatus of claim 2 wherein the unnotched portions of said spacedly notched end comprise welding electrodes for use in spot welding to join the first and second halves of said rolling element retaining cage.

5. The apparatus of claim 2 wherein the unnotched portions of said spacedly notched end comprise:
    dies for use wherein said first half of a rolling element retaining cage is attached to a second half of a rolling element retaining cage by means of tab folding punches.

6. A process for orienting randomly placed rolling elements comprising:
    a. placing an anti-friction bearing sub-assembly with randomly spaced rolling elements in contact with a cylindrical member, said cylindrical member having at least one end spacedly notched such that said notches can receive said rolling elements; and
    b. causing one of said races to move while the other is held stationary, said movement continuing until each of said randomly spaced rolling elements has been received by one of said notches.

7. The process of claim 6 wherein a retaining cage is applied to said sub-assembly after said rolling elements have been received by said notches.

8. The process of claim 6 wherein said movement is rotational.

9. The process of claim 6 wherein said movement is oscillatory.

10. The process of claim 6 wherein said sub-assembly is placed in angular contact with said cylindrical member.

11. The process of claim 7 wherein said retaining cage is metal.

12. The process of claim 7 wherein said retaining cage is plastic.

* * * * *

UNITED STATES PATENT OFFICE
CERTIFICATE OF CORRECTION

PATENT NO. : 3,882,583
DATED : May 13, 1975
INVENTOR(S) : Vic N. Thacker; Loren H. Rasmussen It is certified that error appears in the above-identified patent and that said Letters Patent are hereby corrected as shown below:

Change the name of the Assignee from "Medco, Inc." to --Meedco, Inc.---.

Signed and Sealed this fifth Day of August 1975

[SEAL]

Attest:

RUTH C. MASON
Attesting Officer

C. MARSHALL DANN
Commissioner of Patents and Trademarks